United States Patent Office 3,281,320
Patented Oct. 25, 1966

3,281,320
BIRD MANAGEMENT METHODS AND COLOR STABLE COMPOSITIONS
Lyle D. Goodhue, Bartlesville, Okla., assignor to Phillips Petroleum Company, a corporation of Delaware
No Drawing. Filed May 13, 1964, Ser. No. 367,222
18 Claims. (Cl. 167—46)

This invention relates to the inhibition of undesirable color in organic chemicals. In one aspect, the invention relates to the color stabilization of certain heterocyclic nitrogen-containing compounds subject to discoloration with thiourea compounds. In another aspect, the invention relates to novel color stabilized bird management products containing thiourea compounds. In another aspect, the invention relates to a process for preparing bird management products with a bird food, bird management chemical, and a thiourea compound. In still a further aspect, the invention relates to a method for reducing the number of birds in an area.

The control of birds is a major problem which faces both rural and urban areas. For example, farmers lose large amounts of grain by bird consumption, and large amounts of money are spent in cities attempting to avoid the nuisance created by birds. Flocks of birds in the runway area endanger airplanes which are landing or departing. Also, birds cause further difficulties by aiding in the transmission of various livestock diseases, many of which cause loss of livestock valued in the millions of dollars each year.

Various means been employed to scare or otherwise drive birds away from certain localities. For example, scarecrows have been used for many years by farmers in grains fields or other areas, although this method has actually met with little success. More modern versions of the scarecrow, such as artificial owls and the like, have also met with little success. Certain types of noise makers such as sirens and the like have likewise been used. Still more recently, chemical repellents have been developed which, to some extent, alleviate the problem.

More recently, a new method for controlling birds by preventing large flocks from frequenting specific locations has been developed. U.S. Patent 3,044,930 of L. D. Goodhue et al., filed December 8, 1960, and U.S. Patent 3,113,072 of L. D. Goodhue et al., filed November 13, 1961, describe in detail and claim a process by which birds are controlled using bird management chemicals. According to these patents, various heterocyclic nitrogen-containing compounds are associated with materials that birds will ingest and, when a bird ingests a small amount of a treated material, the actions of the bird, including warning cries emitted, drive other birds from the area. Some of these heterocyclic nitrogen-containing compounds turn bright yellow upon standing in sunlight for a short period of time, that is, they are light sensitive, and many birds, particularly sea gulls, dislike the yellow color of these compounds sufficiently that they refuse to ingest the treated material.

Accordingly, an object of this invention is to prevent the formation of undesirable color in organic compounds.

Another object of this invention is to provide novel color stabilizers or inhibitors.

Another object of this invention is to provide color inhibited bird management compositions.

A further object of this invention is to prepare color stable bird management products.

Another object of this invention is to control birds using bird management chemicals.

A further object of this invention is to prevent the formation of color in heterocyclic nitrogen-containing compounds.

Other objects, aspects, as well as the several advantages of the invention, will be apparent to those skilled in the art upon further consideration of the specification and the appended claims.

According to the invention, the formation of undesirable color in organic compounds subject to discoloration is prevented or retarded by incorporating therein a finite amount of a thiourea compound.

As one feature of the invention, it has been found that the formation of color in bird management compositions comprising a bird management agent and a material which carries bird management agent into a bird's system can be substantially prevented by incorporating therein a small amount of a thiourea precursor compound such as ammonium thiocyanate, thiourea, and substituted thiourea compounds and acid mixtures of these compounds.

Accordingly, it has been found that bird management chemicals, as defined herein, and bird management compositions containing such chemicals, some of which color upon subjection to light, are rendered substantially non-light sensitive when exposed to light in normal usage when one or more of the defined thiourea compounds, with or without an acid, are incorporated therein.

The bird management chemicals presently preferred in the practice of the invention are heterocyclic nitrogen-containing compounds having a structural formula selected from

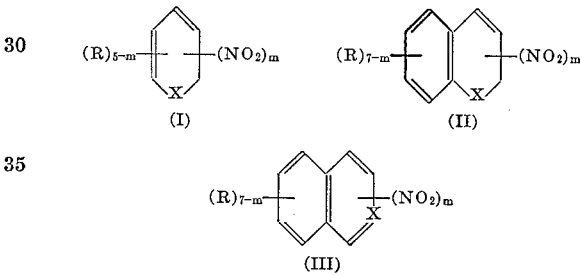

wherein (1) X is selected from the group consisting of

and —N=, (2) $n$ is an integer of from 0 to 2, inclusive, (3) R is selected from the group consisting of hydrogen, methyl and ethyl radicals, and (4) $m$ is an integer selected from 1 and 2. Of the above-defined formulas, compounds falling within the scope of Formula I are presently preferred. Furthermore, it is preferred that not more than one of the R groups be alkyl. As to position, it is preferred that the nitro group be located in the 4-position and that when one of the R groups is alkyl, it is preferred that the alkyl group be located in the 3-position.

Representative and specific examples of nitro-substituted heterocyclic nitrogen-containing compounds of the above general formulas that can be employed according to the invention include:

4-nitro-3-methylpyridine,
3-nitro-2-methylpyridine,
4-nitro-2,5-dimethylpyridine,
4-nitro-2-methyl-5-ethylpyridine,
4-nitro-2,3,6-trimethylpyridine,
3-nitro-2,4,6-trimethylpyridine,
4-nitro-2,3,5,6-tetraethylpyridine,
3,5-dinitropyridine,
3-nitroquinoline,
4-nitro-2,8-dimethylquinoline,
5-nitroisoquinoline,
4-nitro-2,6-diethylquinoline,
4-nitro-3-methylisoquinoline,
4-nitro-2,3,5,6,7,8-hexaethylquinoline, 4-nitro-2-methyl-5-ethylpyridine-N-oxide,
2-methyl-5-ethyl-6-nitropyridine-N-oxide,
5,6,7,8-tetraethyl-2,4-dinitroquinoline-N-oxidedihydrate,
4-nitropyridine-N-oxide,
4-nitro-3-methylpyridine-N-oxide,
4-nitro-2-methylpyridine-N-oxide,
2,4-dinitropyridine-N-oxide,
2-nitropyridine-N-oxide,
5-nitroisoquinoline-N-oxide,
and the like.

Many of the above-defined bird management chemicals or agents can be purchased from commercial sources, but not all are so available. Synthesis of these compounds can be accomplished by conventional techniques. For example, an N-oxide can be formed by reacting pyridine with hydrogen peroxide, charged for example as 30 percent aqueous $H_2O_2$. With acetic acid present in a 4:1 molar ratio of acetic acid to pyridine, the acetic acid serves as an oxygen carrier, forming peracetic acid in situ. Such a reaction can be carried out, for example, at about 85° C. for 10 hours.

After the N-oxide such as pyridine-N-oxide is formed, it is usually most convenient to nitrate, as for example to form 4-nitropyridine-N-oxide. This can be carried out by conventional nitration procedures using a typical molar ratio of pyridine-N-oxide/$HNO_3$/$H_2SO_4$ of 1:3.0–3.5:3.5–7.0. Nitration of the N-oxide is necessary to obtain the nitro group in the 4-position. Similar reactions can be employed to form the other compounds which contain, for example, substituent alkyl radicals. After forming the nitrated N-oxide, if one desires, for example, to convert 4-nitropyridine-N-oxide to 4-nitropyridine, this can be accomplished by reaction with $PCl_3$.

According to the invention, it has been found that color formation due to light or other cause by bird management agents, e.g. nitro-substituted heterocyclic nitrogen-containing compounds, as defined above, can be substantially prevented by incorporating therein a small amount of at least one compound selected from thiourea precursor compounds such as ammonium thiocyanate and thiourea compounds represented by the formula

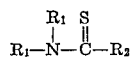

wherein each $R_1$ is selected from the group consisting of hydrogen and hydrocarbon radicals selected from saturated aliphatic, saturated cycloaliphatic and aromatic hydrocarbon radicals and combinations thereof, e.g. alkyl, cycloalkyl, aryl, alkaryl, and aralkyl radicals, having from 1 to 10, inclusive, carbon atoms, and $R_2$ is selected from the group consisting of

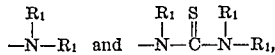

wherein $R_1$ is as previously defined.

Representative and specific examples of stabilizing compounds described above that can be employed according to the practice of the invention include:

ammonium thiocyanate,
thiourea,
N-methylthiourea,
N-ethylthiourea,
N-phenylthiourea,
N,N'-diethylthiourea,
N,N'-di-n-butylthiourea,
N,N'-dicyclohexylthiourea,
N,N,N',N'-tetramethylthiourea,
N-n-butylthiourea,
N-tert-butylthiourea,
N-isopropyl-N'-n-decylthiourea,
N,N'-diphenylthiourea,
N-naphthylthiourea,
N-(4-butylphenyl)-thiourea,
N-(2,4,6-trimethylbenzyl)-N'-cyclohexylthiourea,
N-ethyl-N'-dicyclopentylthiourea,
N-methyldithiobiuret,
N,N,N',N',N''-pentaethyldithiobiuret,
N-phenyldithiobiuret,
N-n-decyl-N'-cyclohexyldithiobiuret,
N,N-dibenzyldithiobiuret,
and the like.

The preferred compound defined above is thiourea. The most preferred composition of the invention is 4-nitropyridine-N-oxide stabilized against color formation with thiourea alone, or in combination with an acid as defined hereinbelow.

In addition to the thiourea compounds or thiourea precursor compounds noted above, the nitro-substituted heterocyclic-containing chemicals of the invention can also contain a small amount of one or more inorganic or organic acids to form, at least in part, a salt of the thiourea compounds. Some specific examples of acids that can be employed in the compositions of the invention include hydrochloric, hydrobromic, hydrofluoric, hydroiodic, nitric, sulfuric, phosphoric, acetic, propionic, oxalic, tartaric, citric, lactic, maleic, fumaric, oleic, phthalic, benzoic, and the like.

If an acid is employed in the compositions of the invention, the amount of acid present can vary over a wide range. Generally, the amount of acid present will be sufficient to provide a weight ratio of acid/thiourea compound of from 0.5:1 to about 5:1. Although this is the presently preferred range, amounts outside this range can be employed.

A very useful bird management chemical according to the invention is 4-nitropyridine-N-oxide. According to a preferred aspect of the invention, bait materials that birds will eat or ingest such as bird foods, and the like, particularly grain and seed are impregnated or treated with 4-nitropyridine-N-oxide and at least one of the defined thiourea stabilizing compounds.

When employing the bird management chemicals of this invention to reduce the number of live birds in an area, one or more of the birds in the area to be cleared must ingest an effective amount of at least one of the chemicals. Ordinarily, the bird management chemical is combined with a bait material, preferably a solid bird food material, which will carry the chemical into a bird's system. The amount of effective bird management chemical which must be ingested by a bird to get the desired effect is within the range of 3 to 500 mg. of the active ingredient per kg. of weight of bird, usually in the range of 5 to 100 mg. per kg., most of the compounds utilized being effective in amounts less than 50 mg. per kg. These bird management chemicals can be conveniently made available to birds by treating particles of solid bird food materials and placing the treated material in an area from which it is desired to clear live birds. For example, grains such as sorghum (milo), corn kernels, chopped corn, chicken feed, kaffir, and the like, or pieces of such other materials as potatoes, bread, nuts, and the like, and similar materials can be used. The invention is particularly applicable to the use of grain, in which case the grain is impregnated with a solution of a bird management chemical and color stabilizing agent in a volatile solvent followed by evaporation to remove the solvent.

The bird management compositions of this invention comprise a material, e.g. solid bird food particles which will carry a bird management chemical into a bird's system, containing from 0.01 to about 10 weight percent of at least one bird management chemical, e.g. one of the above-defined nitro-substituted heterocyclic nitrogen-containing chemicals described in the above formulas. In addition to the active bird management chemicals, the bird management compositions or products will contain at least one of the above-described color stabilizing compounds. The amount of color stabilizing thiourea compound present in the bird management compositions can vary over a wide range, but will generally be present in an amount sufficient to provide a weight ratio of thiourea compound to active bird management chemical of from about 0.25:1 to about 5:1.

As indicated above, the color inhibitors or stabilizers of the invention can be incorporated into nitro-substituted heterocyclic nitrogen-containing compounds per se or can be incorporated into compositions containing nitro-substituted heterocyclic nitrogen-containing compounds, e.g., bird management compositions as defined herein.

The bird management compositions can be prepared in a variety of ways. Practically all of the methods employed to form these compositions require at least one impregnation step when the compositions are employed in combination with a bait material, e.g. bird food such as grain. For example, the bird management compositions can be prepared by impregnating a bait material with a solution of one of the above defined bird management compounds, either alone or in admixture with one of the above-described thiourea compounds, and further in admixture with an acid, if desired. It is also within the scope of the invention to use multiple-stage impregnation, in which case it is preferred to impregnate with the active bird management agent first. However, a presently preferred method of operation is to coimpregnate a bait material, preferably a bird food such as grain, with a solution of one of the above-described bird management chemicals together with one or more of the above-described thiourea compounds. If desired, the co-impregnation solution can contain one or more organic or inorganic acids defined above. Also, if desired, the acid and thiourea compounds can be mixed together prior to mixing with the bird management chemical.

In impregnating bait materials, e.g., bird foods such as grain and seed, with the chemicals and inhibiting agents of this invention, various solvents can be employed. The preferred solvents or carriers are water and water-acetone mixtures. Other adjuvant carrier materials that can be employed include kerosene, naphthas, isoparaffinic hydrocarbon fractions, and the like.

The preferred impregnating solutions ordinarily contain from 0 to about 50 volume percent of acetone, the remainder being water. The amount of impregnating solvent which is employed is not critical, but will usually range from about 50 to about 300 ml. of fluid per kilogram of bird food being impregnated.

The following examples illustrate the effectiveness of the compounds of the invention but are not intended, however, to unduly limit the scope of the invention.

*Example I*

A series of runs was carried out in which candidate compounds were tested as inhibiting agents for preventing color formation of 4-nitropyridine-N-oxide when exposed to the light of an ultraviolet lamp.

In these runs, 1 cc. of a one percent acetone solution of 4-nitropyridine-N-oxide was mixed with from about 10 to 20 milligrams of the candidate compound, after which an eye dropper was employed to drop a small amount of this solution onto filter paper. Simultaneously, control drops of a 1 percent acetone solution of 4-nitropyridine-N-oxide were also placed on the filter paper which did not contain inhibitor. The thus-treated filter paper was placed under an ultraviolet lamp for several hours. Under these conditions, 4-nitropyridine-N-oxide yellows very rapidly to a bright yellow color. Solutions containing dithiobiuret, thiourea, N-methylthiourea, N-ethylthiourea, N-phenylthiourea, N,N'-diethylthiourea, N,N'-dicyclohexylthiourea, N,N'-di-n-butylthiourea, and N,N'-diphenylthiourea as inhibitors did not discolor at the conditions which caused rapid yellowing of the control drops. Urea was not effective, nor was dimethyl-dithiooxamide or dithiooxamide.

A solution containing both thiourea and lactic acid with the 4-nitropyridine-N-oxide did not discolor. Similarly, solutions containing both one of the above-mentioned substituted thioureas and hydrochloric acid with the 4-nitropyridine-N-oxide did not discolor.

*Example II*

A series of solutions was made up which contained 1 percent by weight 4-nitropyridine-N-oxide in water and which also contained X mols of thiourea per mol of 4-nitropyridine-N-oxide present. These solutions were then dropped onto filter paper as in Example I and exposed to the light from an ultraviolet lamp. Solutions containing 0.5 mol of thiourea per mol of 4-nitropyridine-N-oxide and 1.0 mol of thiourea per mol of 4-nitropyridine-N-oxide yellowed some but not as rapidly as when no thiourea was present. A solution containing 2 mols of thiourea per mol of 4-nitropyridine-N-oxide yellowed very slowly, while one containing 4 mols of the thiourea compound on the same basis did not yellow under the conditions used. A further run containing 2 mols of thiourea per mol of 4-nitropyridine-N-oxide and an amount of lactic acid equal to the amount of thiourea on a molar basis was superior to the solution containing 4 mols of thiourea per mol of 4-nitropyridine-N-oxide without lactic acid being present.

An aqueous solution containing 1 percent by weight 4-nitropyridine-N-oxide and 2 percent by weight thiourea was given by syringe to chicks, 10 to 15 days old. The presence of the thiourea did not change the effectiveness of the 4-nitropyridine-N-oxide, as cries and convulsions were evident.

*Example III*

A bird management composition was formulated according to the process of this invention. This composition was formulated by dissolving 0.5 gram of 4-nitropyridine-N-oxide, 1.0 gram of thiourea and 2.0 grams of lactic acid in a mixture of 10 ml. of water and 3 ml. of acetone. This solution was then applied to 100 grams of white milo in a pint jar, after which the sealed jar was rolled on a roller for 1.5 hours. The grain was then dried in a chamber at 100° F. overnight. A similar formulation was made up without the thiourea and lactic acid being present.

When the above-treated grains were exposed to the light from an ultraviolet lamp, the one without thiourea and lactic acid present yellowed immediately. The sample containing thiourea and lactic acid exhibited no change in three hours. The two formulations were exposed to heavy dew, then exposed to sunshine for 10 hours. The composition of this invention containing thiourea and lactic acid did not yellow, but the control formulation yellowed markedly. Both samples of treated grain were washed under the tap in a strainer, then dried at 100° F. and exposed to sunshine. The composition of this invention did not yellow, while the grain which did not contain thiourea and lactic acid yellowed markedly.

Identical formulations were made up except that cracked corn was substituted for the milo. Exposure of these formulations to the light of the sun for 8 hours caused no yellowing in the formulation in which thiourea and lactic acid were present. Extreme yellowing of the corn in which no thiourea and lactic acid were present was noted.

*Example IV*

White milo which had been impregnated with 1 percent thiourea (as an aqueous solution) and dried was offered to pigeons. The pigeons accepted it as readily as untreated grain. The same results were obtained with sparrows.

The white milo containing 4-nitropyridine-N-oxide, thiourea, and lactic acid from Example III was fed to sparrows, and sparrows were noted to experience convulsions and to emit cries. These formulations were exposed to dew all night then sunshine for 10 hours on the next day. The sample which contained no thiourea or lactic acid turned bright yellow, while the compositions of the invention exhibited no yellowing. After exposure to sun light, the composition containing 4-nitropyridine-N-oxide, thiourea and lactic acid was given to sparrows, and the sparrows quickly exhibited convulsions and emitted warning cries.

*Example V*

A series of runs was carried out in which corn chops were impregnated with 4-nitropyridine-N-oxide, thiourea and in some cases, an acid. After impregnation and drying, the prepared grain was then exposed to sunlight for 8 hours and the amount of yellowing was determined. The results of these tests are expressed below in Table I.

TABLE I

| Run No. | 1 | 2 | 3 | 4 | 5 | 6 |
|---|---|---|---|---|---|---|
| Corn chops, g | 100 | 100 | 100 | 100 | 100 | 100 |
| 4-nitropyridine-N-oxide, g | 0.5 | 0.5 | 0.5 | 0.5 | 0.5 | 0.5 |
| Thiourea, grams | 1.0 | 0.5 | 0.25 | 0.5 | 0.5 | 0.5 |
| Acid | | | | Tartaric | Citric | $H_3PO_4$ |
| Grams acid | | | | 0.5 | 0.5 | 0.5 |
| Water, ml | 10 | 10 | 10 | 10 | 10 | 10 |
| Acetone, ml | 3 | 3 | 3 | 3 | 3 | 3 |
| Results | (¹) | (²) | (³) | (⁴) | (⁵) | (⁵) |

¹ Some color reductions.
² Yellower than Run 1.
³ Yellower than Runs 1 or 2.
⁴ No Color.
⁵ Slight Yellow.

*Example VI*

A series of runs was carried out in which corn chops were impregnated with 4-nitropyridine-N-oxide, thiourea and a mineral acid (HCl, $H_2SO_4$, $HNO_3$ and $H_3PO_4$). The following formulations were used:

Corn chops _____ gr__ 1000
4-nitropyridine-N-oxide _____ gr__ 5.0
Thiourea _____ gr__ 5.0
Acid (conc.) _____ ml__ 6.0
Water _____ ml__ 150
Acetone _____ ml__ 50

The 4-nitropyridine-N-oxide and thiourea were weighed into a 4 liter beaker. The water (60° C.) and acid were mixed and poured over the chemicals. The acetone was added and stirring was continued until the solids dissolved, which requires about 5 minutes. The solution was poured over the grain in a 5 gallon bottle, stoppered and rolled for about 1 hour. The damp grain was then poured onto screen wire trays and dried overnight at 100–110° F. This reduces the moisture content to less than 10 percent where the resulting product keeps well. The product thus formed develops no yellow color upon exposure to bright sunlight for 2 days and only a barely perceptible change occurs in 7 days. Of the above compositions tested, the compositions containing HCl were the least effected as far as color change was concerned.

*Example VII*

A field test was carried out in which 4-nitropyridine-N-oxide was impregnated into mixed grains consisting of white and red milo, corn chops, and wheat. This material was color inhibited by co-impregnation of an aqueous HCl solution of thiourea. The field test gave good results on pigeons and sparrows and many birds were noted to be experiencing convulsions and emitting cries after ingesting the treated grain. There was no evidence that the presence of the thiourea in the treated grain in any way retarded or deterred birds from accepting this treated grain.

*Example VIII*

In another field test, white sorghum was impregnated with a solution containing 4-nitropyridine-N-oxide, tartaric acid and thiourea. The grain (100 grams) was impregnated with a solution containing sufficient amounts of the above compounds to provide a half gram each of 4-nitropyridine-N-oxide, thiourea and tartaric acid in the grain. The resulting bird management composition was color inhibited by the presence of the tartaric acid solution of thiourea. The bird management composition prepared as described was distributed near a grain elevator and in hog lots. The field tests gave good results for pigeons, sparrows, and many other birds, since birds were noted to be experiencing convulsions and emitting cries after ingesting some of the treated grain. There was no evidence that the presence of the thiourea and tartaric acid in the treated grain in any way retarded or deterred birds from accepting this treated grain.

*Example IX*

Corn chops were impregnated with a solution of 4-nitropyridine-N-oxide in a 50:50 acetone/water solvent using sufficient solution to provide 0.5 weight percent of 4-nitropyridine-N-oxide in the grain after drying. In a field test using this grain, sunlight caused the grain to yellow almost immediately, and pigeons and sparrows did not accept this grain after it had yellowed.

As will be evident to those skilled in the art, many variations and modifications of this invention can be practiced in view of the foregoing disclosure.

I claim:

1. A composition of matter stabilized against discoloration comprising (a) a heterocyclic nitrogen-containing compound having a structural formula selected from

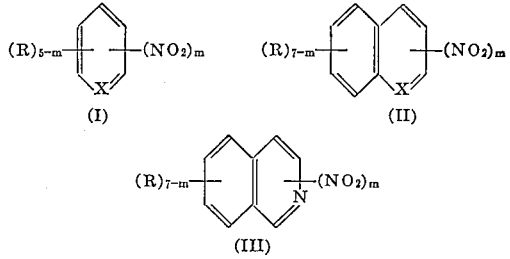

wherein (1) X is selected from the group consisting of —N= and

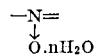

(2) *n* is an integer of zero through 2, (3) R is selected from the group consisting of hydrogen, methyl and ethyl and (4) *m* is an integer of 1 and 2, and (b) a color stabilizing amount of thiourea precursors and thiourea compounds having the structural formula

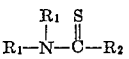

wherein (1) $R_1$ is a hydrocarbon radical selected from the group consisting of saturated aliphatic, saturated cycloaliphatic and aromatic hydrocarbons having from 1 through 10, inclusive, carbon atoms, and (2) $R_2$ is selected from the group consisting of

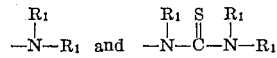

wherein $R_1$ is as previously defined.

2. The composition of claim 1 which has incorporated therein (c) an acid, the weight ratio of (c) to (b) being 0.5:1 to 5:1.

3. A composition comprising a liquid or solid carrier material containing (a) from 0.01 to 10 percent by weight, based on said material, of a nitro-substituted heterocyclic nitrogen-containing bird management agent having a formula as defined in claim 1, and (b) a thiourea compound having a structural formula as defined in claim 1, the weight ratio of (b) to (a) ranging from 0.25:1 to 5:1.

4. The composition of claim 3 wherein said carrier material is grain.

5. The composition of claim 4 which has incorporated therein (c) an acid, the weight ratio of (c) to (b) being 0.5:1 to 5:1.

6. A bird management composition comprising (a) grain impregnated with (b) from 0.01 to 10 weight percent, based on said grain, of 4-nitropyridine-N-oxide and (c) thiourea, the weight ratio of (c) to (b) ranging from 0.25:1 to 5:1.

7. The composition of claim 6 which has incorporated therein (d) an acid selected from the group consisting of lactic acid, tartaric acid, citric acid, phosphoric acid, and hydrochloric acid, the weight ratio of (d) to (c) being 0.5:1 to 5:1.

8. A composition of matter comprising (a) 4-nitropyridine-N-oxide and (b) thiourea, the weight ratio of (b) to (a) ranging from 0.25:1 to 5:1.

9. A composition of matter comprising (a) 4-nitropyridine-N-oxide and (b) dithiobiuret, the weight ratio of (b) to (a) ranging from 0.25:1 to 5:1.

10. A composition of matter comprising (a) 4-nitropyridine-N-oxide, (b) a color stabilizer selected from the group consisting of N-methylthiourea, N-ethylthiourea, N-phenylthiourea, N,N'-diethylthiourea, N,N'-dicyclohexylthiourea, N,N'-di-$n$-butylthiourea, and N,N'-diphenylthiourea, the weight ratio of (b) to (a) ranging from 0.25:1 to 5:1, and (c) hydrochloric acid, the weight ratio of (c) to (b) ranging from 0 to 5:1.

11. The method of preventing discoloration of organic nitro-substituted heterocyclic nitrogen-containing compounds having a formula as defined in claim 1 subject to discoloration which comprises incorporating therein a color stabilizing amount of a thiourea compound having a formula as defined in claim 1.

12. The method of preventing discoloration according to claim 11 wherein said color stabilizing amount is an amount sufficient to provide a weight ratio of thiourea compound to said nitro-substituted heterocyclic nitrogen-containing compound of from about 0.25:1 to about 5:1.

13. A method for the preparation of a bird management product which comprises the steps of (1) impregnating a solid particle of bird food with a light sensitive bird management chemical dissolved in a solvent which penetrates readily into said particle of food thereby dispersing said chemical throughout the body of said particle, said chemical being a heterocyclic nitrogen-containing compound having a structural formula as defined in claim 1, and (2) thereafter treating said particle of bird food with a treating agent comprising a thiourea compound having a structural formula as defined in claim 1, thereby preventing unwanted color formation on the surface of said particle of food without alteration of said bird management chemical in the body of said particle.

14. A method for the preparation of a bird management product comprising coimpregnating a particle of bird food with 4-nitropyridine-N-oxide and thiourea dissolved in aqueous acetone, thereby preventing unwanted color formation on the surface of said particle without alteration of said 4-nitropyridine-N-oxide in the body of said particle.

15. A method for preparing a bird management product which comprises the steps of (1) impregnating grain with from 0.01 to 10 weight percent of a solution of a heterocyclic nitrogen-containing compound having a structural formula as defined in claim 1, (2) drying the composition thus formed, (3) impregnating the dried composition of step (2) with a solution of a thiourea compound having a structural formula as defined in claim 1, and (4) drying the resulting composition so formed.

16. A method of reducing the number of live birds in an area which comprises distributing within said area a bird management product containing an effective amount of a light sensitive bird management chemical having a structural formula as defined in claim 1 dispersed therein, that portion of said chemical normally exposed to light having been made non-light sensitive by treating said product with a thiourea compound having a structural formula as defined in claim 1.

17. A method of reducing the number of live birds in an area which comprises causing at least one of the birds in said area to ingest from 3 to 500 mg. of a bird management agent per kg. of bird weight, said bird management product containing (1) a heterocyclic nitrogen-containing compound having a structural formula as defined in claim 1 and (2) a thiourea compound having the structural formula as defined in claim 1.

18. The method of clearing an area of birds which comprises distributing within said area a bird management product comprising a solid bird food particle containing an effective amount of 4-nitropyridine-N-oxide bird management agent dispersed throughout, that portion of said 4-nitropyridine-N-oxide normally exposed to light having been made non-light sensitive by treating the surface of said particle with an aqueous solution containing hydrochloric acid and thiourea.

References Cited by the Examiner
UNITED STATES PATENTS

| | | | |
|---|---|---|---|
| 3,044,930 | 7/1962 | Goodhue | 167—46 |
| 3,113,072 | 12/1963 | Goodhue | 167—46 |
| 3,150,041 | 9/1964 | Goodhue | 167—46 |
| 3,193,455 | 7/1965 | Reinert | 167—46 |

JULIAN S. LEVITT, *Primary Examiner.*

STANLEY J. FRIEDMAN, *Assistant Examiner.*